UNITED STATES PATENT OFFICE.

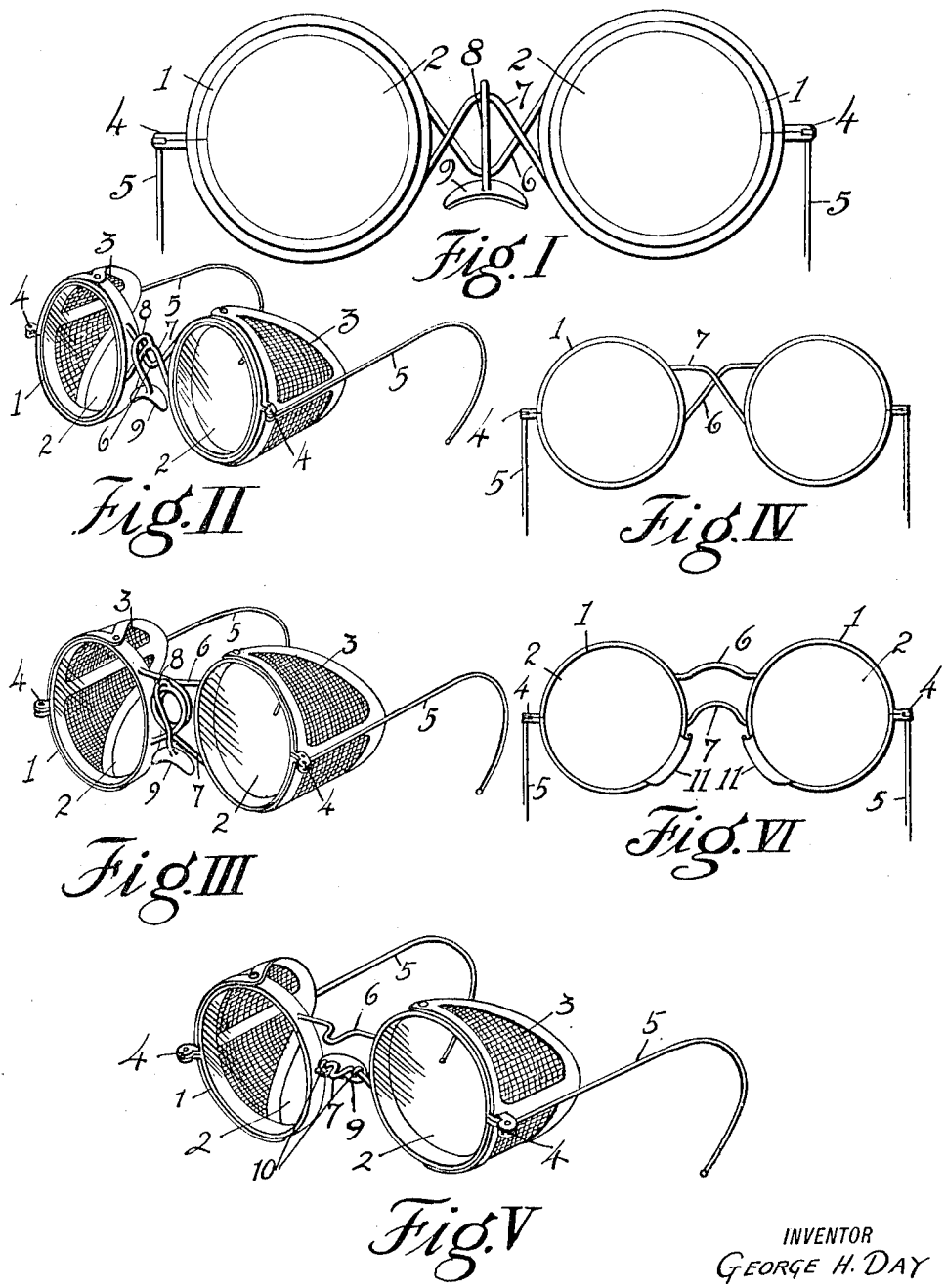

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-PROTECTOR.

1,241,715.  Specification of Letters Patent.  Patented Oct. 2, 1917.

Original application filed December 19, 1914, Serial No. 878,178. Divided and this application filed November 9, 1916. Serial No. 130,396.

*To all whom it may concern:*

Be it known that I, GEORGE H. DAY, a citizen of the United States, residing at Southbridge, in the county of Worcester and State of Massachusetts, have invented certain new and useful Improvements in Eye-Protectors, of which the following is a specification.

This invention relates to improvements in eye protectors, and has particular reference to that form of protector disclosed in my co-pending application for Letters Patent Serial No. 878,178, filed December 19, 1914, of which the present application is a division.

One of the leading objects of the present invention is the provision of improved construction of bridging or lens connecting members for use in goggles, eye protectors or the like, which shall facilitate the ready relative adjustment of the lenses as desired.

A further object of the present invention is the provision of a mounting of this character which shall embody bridging or connecting members having separate therefrom but associated therewith a nose bearing member which shall at all times be automatically centrally positioned as respects the lenses, regardless of their relative adjustment.

Other objects and advantages of my improved construction should be readily apparent by reference to the following specification taken in connection with the accompanying drawings forming a part thereof, and it will be understood that I may make any modifications in the specific details of construction shown and described within the scope of the appended claims without departing from or exceeding the spirit of my invention.

Figure I represents a view in elevation of one embodiment of my improved construction.

Fig. II represents a perspective view thereof.

Fig. III represents a perspective view of another form having a greater range of adjustment.

Fig. IV represents a front view of a simplified form of my construction.

Fig. V represents a perspective view of another modified form thereof provided with the nose rest.

Fig. VI is a front view of another modification of my construction.

In the drawings, in which similar characters of reference are employed to denote corresponding parts throughout the several views, the numeral 1 designates the lens retaining frames for the usual lenses 2, said frames being in the form illustrated provided with the screen portions 3, and with end pieces 4 for the ear engaging temples 5 shown for securing the parts in position on the face, although it will be understood that head bands or other retaining devices may be employed if preferred.

In that form of invention illustrated in Figs. I and II, I have shown as connecting the lens frames 1, the pair of oppositely looped cross members 6 and 7, the member 6 being shown as having its ends connected to the upper portion of the frames 1 and depending in a downwardly extending loop or U-shaped portion, while the member 7 is connected to the frame at a point lower than the member 6 and extends upwardly in an arch, the length of both the members 6 and 7 being preferably considerably greater than the maximum desired distance between the pair of frames 1 so that a loop will always be present facilitating desired adjustment of the parts.

In this form of the invention, to most comfortably support the mounting on the face, I have shown as attached to one of the members 6 or 7, in the particular form illustrated, in fact attached to the member 7, a post 8, which may be either straight or looped, as preferred, and which is provided on its lower end with the nose bearing rest or crest pad 9, the post 8 as well as the members 6 and 7 being formed from pliable material so that the several parts may be readily bent to adjust the mounting to the face. In the adjustment of the mounting it is ordinarily necessary merely to grasp the lens frames 1 and either draw them apart opening up the loops of the members 6 and 7 or pressing them together to increase said loops in order to increase or decrease the distance between the lenses as desired to give the correct pupillary distance and fit to the mounting. The length and adjustment of the post 8 is such as to ordinarily bring the nose rest pad 9 in proper position to engage the nose of the wearer, it being understood however, that this arm may be bent as desired to secure the exact correct fit of the post 9 to the nose, while on account of the attachment of the post to the center of one of the looped members, the post and thus the nose rest, will normally be equally separated or spaced from the two frames 1 to properly center the mounting on the face, although of course the nose rest may be deflected from such position if desired by suitable adjustment of the post 8, in the event that the nose is slightly off center or for any other reason it is desired to vary the relation of the frame to the face or nose.

In Fig. III, I have illustrated a form of my invention which will preserve a neater appearance for corresponding possibility of adjustment and which will permit of the greatest possible range of adjustment being made, although at all times presenting a neat and attractive appearance. This result I accomplish by forming each of the members 6 and 7 into a complete spiral or circular loop in place of a plain open loop, thus giving greater length to said members in a less conspicuous manner than would be the case were the loop much elongated over the form shown in Fig. I. The bridge is preferably attached by means of the post 8, however, as just described in connection with Figs. I and II, and the manner of adjustment is substantially the same.

Fig. IV illustrates another modification of my invention, in which in place of the member 6 having both its ends attached to the upper portion of the frames 1 and the member 7 having both ends attached beneath the point of attachment of the ends of the member 6, the said members are formed as in Fig. I with the loops or bends therein but are attached diagonally, that is to say, one end of the member 6 is attached to a lens frame on one side above, and to the lens frame on the opposite side below corresponding ends of the member 7, while if desired in connection with this form the bridge rest may be dispensed with, making an extremely simple construction for light weight frames.

In Figs. V and VI, I have illustrated a still further modification of my invention, particularly adapted for minor or less pronounced adjustments than are the forms hitherto described. In Fig. V, I have shown the members 6 and 7 as formed preferably with forwardly in place of upwardly and downwardly extending loops, while I have also here illustrated a modified form of nose rest 9 having a pair of loops 10 fitting around the bridging or connecting member 7 so that the member 7 may slide through said loop and enable the bridge to remain in central correct nose engaging position while at the same time allowing of ready adjustment of the bridging member, as desired.

In Fig. VI, I have shown a similar construction in which the members 6 and 7 are but slightly in place of pronouncedly looped, while I have provided the nose bearing portions 11 secured directly to the lens frames 1 in place of on the adjustable lens frame connecting member.

From the foregoing description taken in connection with the accompanying drawings, the construction and general advantages of my improved connecting member for the lens frames of goggles, eye protectors, or the like, should be readily apparent. Particular attention, however, is invited to the fact that by the use of my invention it is possible to adjust the lenses in a parallel direction either inwardly or outwardly without disturbing the axis of the lenses, thus making it possible to mount prescription lenses in my improved frame, a matter hitherto rendered practically impossible in ordinary types of adjustable frame, due to the fact that the adjustment in the previously known frames required a relative twisting of lenses or the like tending to disturb the relationship of the axes of the lenses, and destroying their prescriptive value.

I claim:

1. In an eye protector, the combination with a pair of lens frames, of an upper member having its ends connected to the two frames and having a central loop formed therein, and a second member having its ends connected to the frames below the ends of the first and being similarly provided with a loop whereby the distance between the frames may be readily adjusted by opening or closing of the loop while maintaining the horizontal relationship of the frames.

2. In an eye protector, the combination with a pair of lens frames, of an upper member having its ends connected to the two frames and having a central loop formed therein, and a second member having its ends connected to the frames below the ends of the first and being similarly provided with a loop whereby the distance between the frames may be readily adjusted by opening or closing of the loop while maintaining the horizontal relationship of the frames, and a nose engaging member carried by one of said looped members.

3. In a device of the character described, the combination with a pair of lens frames, of similar upper and lower connecting bars for the frames, each of said bars being provided with a central loop, and a nose engaging member carried by the lower of said bars, substantially as and for the purpose described.

4. The combination with a pair of lens frames, of means for connecting said frames, said means comprising a bar secured to the upper portion of the two frames and formed with a central depending looped portion, a second bar secured to the two frames below the point of attachment of the first and formed with a centrally upwardly extending looped portion, a nose rest, and a pliable post having one end secured to the nose rest and the other end secured to one of the loops for adjustably connecting the rest to the lens connecting member.

5. In a device of the character described, the combination with a pair of lens frames, of an upper and a lower connecting bar for said frames, said upper bar being formed with a central downwardly extending looped portion and said lower bar being formed with a central upwardly extending looped portion, whereby the lenses may be given a parallel adjustment by corresponding opening or closing of the looped portion.

In testimony whereof I affix my signature in the presence of two witnesses.

GEORGE H. DAY.

Witnesses:
H. K. PARSONS,
E. M. HALVORSEN.

Copies of this patent may be obtained for five cents each, by addressing the "Commissioner of Patents, Washington, D. C."